United States Patent [19]
Psiuk

[11] Patent Number: 5,352,539
[45] Date of Patent: Oct. 4, 1994

[54] EXTRUDER HOUSING FOR DOUBLE-SCREW EXTRUDER HAVING AN ANNULARLY STEPPED INTERNAL BORE COVERED BY A HOT ISOSTATICALLY-PRESSED STRUCTURE, AND METHOD OF MAKING SAME

[75] Inventor: Werner G. Psiuk, Hannover, Fed. Rep. of Germany

[73] Assignee: Friedrich Theysohn GmbH, Langenhagen, Fed. Rep. of Germany

[21] Appl. No.: 967,075

[22] Filed: Oct. 27, 1992

[51] Int. Cl.$^5$ .............................. B22F 7/04; B22F 7/08; B01F 7/12; A23P 1/12
[52] U.S. Cl. ............................................ 428/558; 419/8; 419/49; 366/349; 366/84; 425/208; 72/253.1; 72/272
[58] Field of Search .................... 419/8, 49; 428/553, 428/558; 366/349, 84; 425/208; 72/253.1, 272

[56] References Cited
U.S. PATENT DOCUMENTS

| 4,855,103 | 8/1989 | Ekbom ........................... 419/26 |
| 5,116,135 | 6/1992 | Kaiser et al. ................... 366/349 |
| 5,223,345 | 6/1993 | Kaiser et al. ................... 428/557 |

Primary Examiner—Donald P. Walsh
Assistant Examiner—Anthony R. Chi
Attorney, Agent, or Firm—Herbert Dubno

[57] ABSTRACT

An extruder housing is formed for a double-worm or double-screw extruder by providing a steel body with a seamless one-piece structure and hot-isostatically pressing the body and the powder-metallurgical wear-resistant material lining the preferably conical bores of the housing to form a wear-resistant layer which is bonded to the steel body by a diffusion layer.

12 Claims, 2 Drawing Sheets

EXTRUDER HOUSING FOR DOUBLE-SCREW EXTRUDER HAVING AN ANNULARLY STEPPED INTERNAL BORE COVERED BY A HOT ISOSTATICALLY-PRESSED STRUCTURE, AND METHOD OF MAKING SAME

FIELD OF THE INVENTION

My present invention relates to an extruder housing for a double-screw extruder having a wear-resistant lining along the bores receiving the extruder screws and to a method of making the housing. More particularly, the invention relates to an extruder housing wherein the wear-resistant layer is of powder metallurgical origin, is formed by a hot-isostatic pressing process and wherein a diffusion layer partly formed of the material of the wear-resistant layer, bonds the wear-resistant layer to the base material of a seamless elongated body forming the outer structure of the housing.

BACKGROUND OF THE INVENTION

It is known to provide double-worm or double-screw systems in which two screws or worms interdigitate or interleave with one another in an elongated housing in which these worms or screws extend through respective bores collectively forming a cavity of a figure-eight cross section.

Apparatus of this type is used for the processing of plastics and synthetic resins, i.e. for the plastifying thereof, to transform pieces of the plastic material into a liquefied or flowable plastified state. Since the plastified product is ejected forceably at an end of the housing, such apparatus can be referred to as an extruder, although the apparatus may be used for blending, mixing, compounding and like processes in addition to liquefying or plastifying a mass.

For the purposes of the present disclosure, all such apparatus will be referred to as extruders and, in particularly, as double-screw extruders, the screws and worms of which are rotated in opposite senses or in the same senses.

The extruder may be designed to shape an elongated workpiece, e.g. by forcing the plastified material through an extrusion die, or simply as a compounder to produce synthetic resins of various kinds and compositions. It may be employed at an input side of a mold to deliver flowable material for injection into the mold of an injection molding apparatus.

Double-worm or double-screw extruders of the aforedescribed types generally have had one piece or multiple piece housings. In a one-piece housing, the housing along the cavity is seamless whereas in a multi-piece housing, the housing is assembled, usually by bolting, from a number of parts.

With rotation of the screws or worms in the same sense or in opposite senses, the processed material is forced along the cavity and is subjected to intensive shear action and pressure to effect liquefaction.

The mass of material which is displaced can include solids with or without fillers which can have an abrasive action against the housing walls.

Furthermore, the walls are subject to considerable wear where they are engaged by the flights, threads or turns of the screws, or where the screws draw abrasive solids or suspensions of abrasive fillers in the liquefied mass along these walls. The continuous wear during use of the walls of the cavity has increased in recent years with the tendency to use greater proportions of abrasive fillers and even corrosive additives in the processed synthetic resins.

The wear of the wall of the cavity becomes a life-determining factor for the extruder housing.

It is thus important to minimize such wear and increase the useful life of the extruder housing.

This has been done heretofore by lining the housing with a hardening material, e.g. a so-called hard facing material, or by applying other special coatings to the cavity walls. Hardenable materials can include hardenable steels which can be hardened by nitriding or ion-nitriding processes. The coating of self-flowing hard alloys of an iron, nickel or cobalt base as applied by thermal spraying, for example, or plasma deposition welding, rotation coating and the like has also been proposed. It is also possible to provide wear-resistant inner liners which are preformed and then inserted into the housing body.

In all of the earlier techniques, however, complete satisfaction could not be obtained for a variety of reasons. For the most part, crack formation, pore formation and like defects could arise in the layer. Frequently, moreover, distortion was a problem.

OBJECTS OF THE INVENTION

It is, therefore, the principal object of the present invention to provide an improved double-screw extruder housing whereby the disadvantages of earlier housings are avoided, in particular with respect to wear of the housing wall.

Another object of the invention is to provide an improved double-screw extruder housing having a wear-resistant layer or lining which is less susceptible to the defects of linings hitherto provided on the steel body of prior-art housings, like crack formation, pore formation and distortion.

It is also an object of this invention to provide an improved method of making an extruder housing whereby disadvantages of earlier techniques are obviated.

SUMMARY OF THE INVENTION

These objects and others which will become apparent hereinafter are attained, in accordance with the invention by applying the wear-resistant hard layer or coating by hot-isostatic pressing (HIP) and effecting at least a partial fusion or melt of the HIP applied layer so that a diffusion layer is formed between the hard facing and the steel body of the extruder which preferably is a one-piece seamless structure. The diffusion layer serves to bond the hard-facing layer to the steel body. Advantageously, the assembly of the body and layer is subjected to HIP.

More particularly, the extruder housing for a double-screw extruder for processing plastics and synthetic resins can comprise:

- a seamless elongated body formed with a pair of adjacent longitudinally extending bores for receiving respective extruder screws and together defining a figure-eight cross section cavity;
- a wear resistant layer of a hard powder-metallurgical material in a hot isostatically pressed structure extending along and lining the cavity against the body; and
- a diffusion layer formed by the material of the layer and material of the body bonding the wear resistant layer to the body.

In this manner it is possible to so form a wear-resistant layer in the interior of the extruder housing that a pore-free and crack-free layer diffusion bonded to the base body, of high homogeneity and a high carbide content can be obtained.

In practice, the known extruder housings with wear-resistant inner layers over which the invention constitutes an improvement, were usually multipartite housings. They comprised, for example, two separate tubes which were joined together along or parallel to longitudinal axes of these tubes by weld seams. The fabrication of such housings has been found to be expensive and time-consuming and, because of the presence of longitudinal weld seams, there was always the danger of distortion of the round outer contour. This had drawbacks in the assembly of the longitudinally-welded wear inserts with the base body.

Frequently there were small holes between the base body and the wear insert which gave rise to drawbacks in the uniform temperature control of the extruded material. In other words, locally overheated or locally underheated portions could be found to exist in the extruded material.

Since the hard facing layer is diffused into and joined by the diffusion layer with the base body of the extruder housing, only a minimum of machining is required following the application of the layer.

As noted, it is important that the housing body be a one-piece body or seamless structure and that the hard layer have a metallurgical structure of powder metallurgical origin and formed by the HIP process, with a diffusion layer bonding the base material of the housing to the hard material of the coating.

The extruder housing and the hard layer therewithin are thus fabricated in a special manner, namely, by the technological principles of hot-isostatic pressing. Any machining of the extruder housing is usually confined to a material removal along the outer contours of the housing and along the inner surface of the hard layer, e.g. by grinding.

The inner contour of the hard layer during the hot isostatic pressing thereof is usually provided by a correspondingly shaped core so that any internal machining that is required can be effected with a minimum of material removal, e.g. by grinding or honing.

According to a feature of the invention, the preferred form of the two internal chambers or bores is conical and the conical bores taper in the direction of the displacement of the material which is processed or toward the extruder outlet end, these bores being configured to accommodate conical extruder worms. The conical shape is also provided during the HIP process so that all of the advantages of the hard layer applied by the HIP technology are obtained.

As has already been indicated, HIP technology is known. In the case of the present invention, however, for the production of an extruder housing in conical form, it is used in an entirely unique and special way. The HIP technology allows an extruder housing to be fabricated with correspondingly conical cores within the base body of the extruder so that the chambers left upon removal of the cores can correspond substantially precisely to the contours of the worms which are used.

For the housing body, conventional steel alloys can be employed.

In the simplified fabrication of the base body, the two housing chambers or bores are provided in a step-wise manner, i.e. the two housing chambers or bores are provided in a step-wise manner, i.e. instead of a continuous taper, with a succession of smaller diameter steps spaced apart in the direction of the outlet of the extruder. The powder metallurgical material is then applied and given a conical shape by the mandrels or cores and the material during the hot pressing step is caused to diffuse to all surfaces of the step including those which are parallel to the axis of the cavity as well as those which are perpendicular to the axis.

The material of the hard layer can be any material which will have the desired resistance to wear under the operating conditions specified, namely, resistance to wear by abrasives, adhesive or corrosive materials in the compositions processed or combinations thereof. Powder metallurgical tool steel for cold working may be used as can, for example, cobalt-chromium alloys like stellate, or powder metallurgical nickel, chromium, silicon or boron alloys or compositions. Carbides, nitrides and silicides used for hard facing purposes, including tungsten carbide, silicon nitride and the like may be employed as well.

BRIEF DESCRIPTION OF THE DRAWING

The above and other objects, features and advantages of the present invention will become more readily apparent from the following description, reference being made to the accompanying drawing in which.

SPECIFIC DESCRIPTION

The extruder housings of FIGS. 1–5 are intended for double-worm or double-screw extruders for the processing of synthetic resins, synthetic resin mixtures and plastics or plastifiable compositions generally. They comprise a housing body 2 in the form of a seamless elongated steel structure which can have a wear-resistant lining or layer 3 within the figure-eight cavity formed by two bores 4 for respective screws or worms which have not been illustrated.

The seamless body 2 can be composed of any conventional machine-construction steel. The hard layer 3 has a structure formed by hot isostatic pressing of a powder layer and thus has the lattice structure characteristic of HIP.

The steel body 2 and the hard layer 3 are bonded together by a diffusion layer 5 formed by diffusion of the material from the layer 3, upon melting thereof, into the material of the body 2 at the interface formed between the powder metallurgical body and the body 2 during the hot-isostatic pressing.

Figure 1:
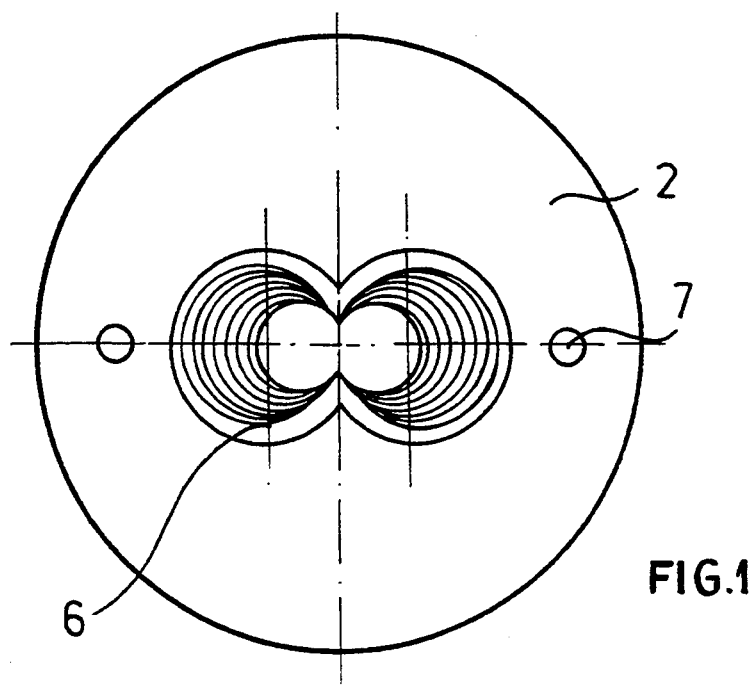
FIG. 1 is an end view of the barrel or body of an extruder housing preformed with stepped bores to be lined with the hard material.
Figure 2:
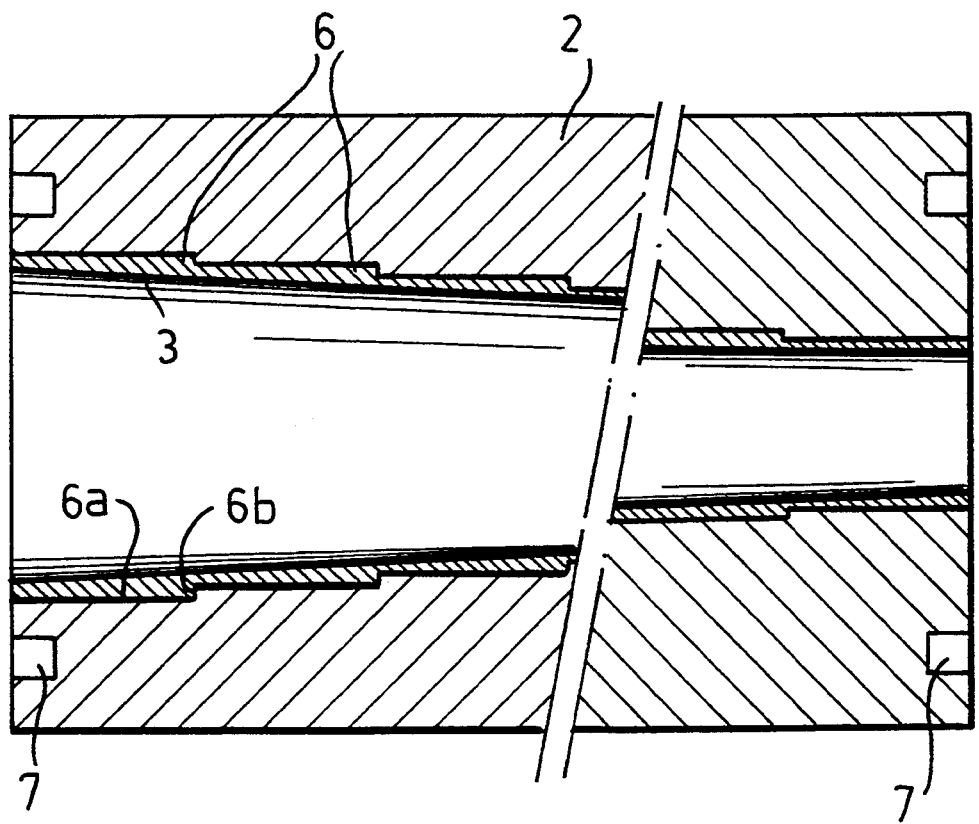
FIG. 2 is a longitudinal section through this body of an extruder housing wherein, however, a conical lining or layer of the hard material is provided with each stepped bore.

As can be seen from FIG. 2, the layer 3 fills all of the step chambers of the stepped bores 6 formed in the body of FIGS. 1 and 2.

The diffusion layer is formed along the cylindrical portions 6a as well as the transverse portions or shoulders 6b of the respective steps.

Figure 3:
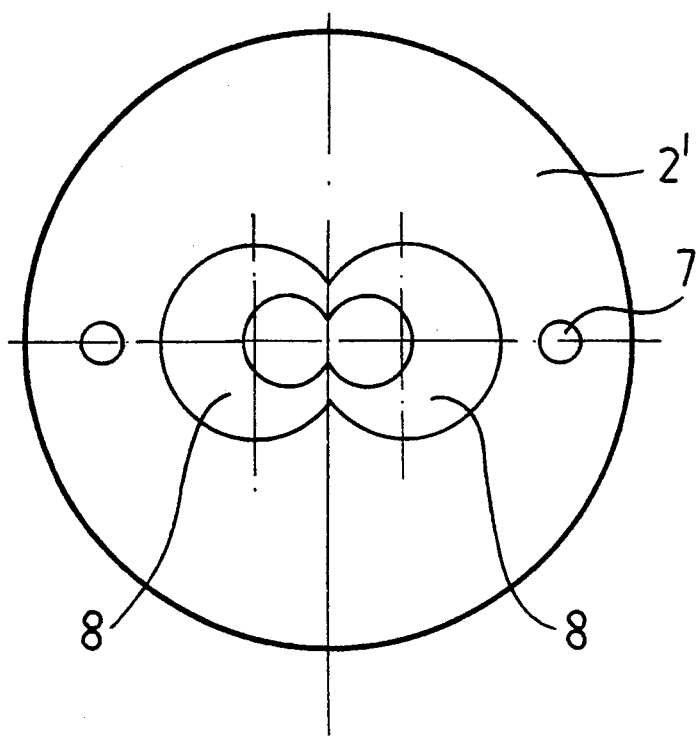
FIG. 3 is an end view of an extruder housing provided with prefabricated conical bores in the housing body.
Figure 4:
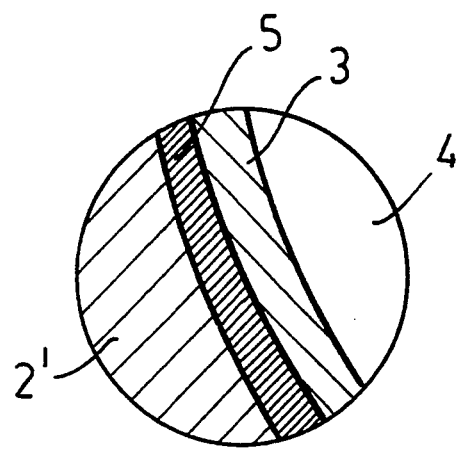
FIG. 4 is a detail section showing the lining, the diffusion layer and the body and corresponding to the region V of FIG. 5.
Figure 5:
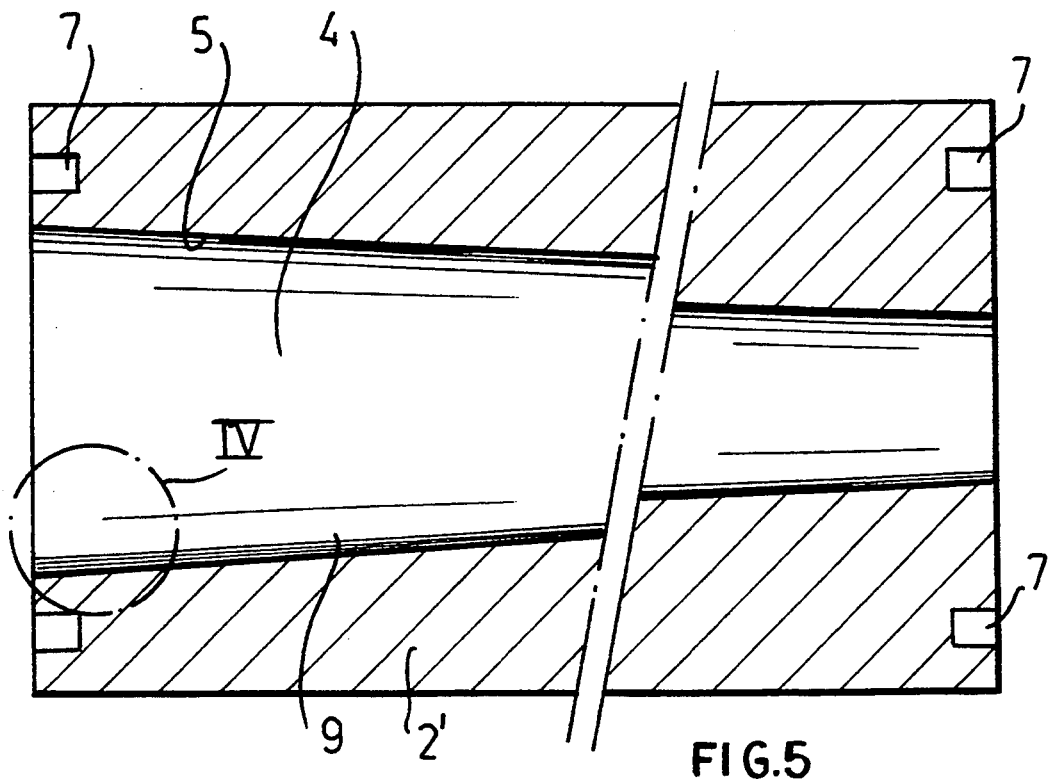
FIG. 5 is a longitudinal section through the housing of FIGS. 3 and 4.

The body 2' of FIGS. 3-5 can be formed as a seamless one-piece body directly with conical bores 8, together forming a figure-eight cavity 9, the lining 3 extending in uniform thickness over the surfaces of the bores 4.

Bores 7 for receiving pins or the like can be formed at ends of the body 2, 2' and serve to enable the body to be connected to the balance of the extruder and for applying covers to the ends of the bodies during the hot-isostatic pressing.

The extruder housing of FIGS. 3-5 can also be so formed that it can be connected with a section to like housings of a longer double-worm or double-screw extruder by flanges or by means of pins or anchors so that the unit shown in FIGS. 3-5 can represent one of a succession of lengths of the extruder housing assembled to form the apparatus.

The following table represents examples of extruders assembled from various materials according to the invention, indicating the materials of the wear-resistant layer 3, 5. From the table it will be apparent that some of the materials are suitable also as hard coatings for the extruder worms.

| Hard Material Layer Quality | Hardness HRc at$^{Rt}$ | Alloy Base (for Hard Layer) | For Component Hard Layer of Body | Worm |
|---|---|---|---|---|
| TH-O10 | 56 | Co-Base plus W, Cr | x | x |
| TH-065 | 58-62 | Ni-Base plus Cr, Si, B | x | |
| TH-11 K | 58-62 | Fe-Base plus Cr, V, Mo Hardenable | x | |
| TH-11 KS | 60-64 | Fe-Base plus Cr, V, Mo | x | |

The method of fabricating the housing can utilize the gas-tight weldability of the base body and can be effected without any special pressing form or encapsulation. In this method, therefore, two conical cores are inserted into the performed bores of the steel body and disposed internally therein, the conical cores being slightly smaller in cross section than the bores and substantially of the outer diameters of the screws or worms which are ultimately to be inserted in the bodies.

In the stepped bores or the conical bores, the powder forming the hard material can be introduced and the body with the cores and the powder therein can be closed gas-tightly or hermetically by welding at the ends of the body. Because of the gas-tight welding between the housing body and the cores an additional encapsulation of the structure is not required to assure the isostatic compression.

The entire structure with powder, cores and body can be introduced into a pressure chamber and subjected to a high pressure externally of the body, thereby plastically deforming the body inwardly, subjecting the body and the powder to hot isostatic pressing and bonding the powder into a coherent layer while forming the diffusion layer between the resulting wear-resistant layer and the body. Since the cores can take the compression without substantial deformation, or with only a slight deformation, the wear-resistant lining, upon grinding away of the welds and removal of the cores, will have inner diameters corresponding to the outer diameters of the worms or can be machined to so correspond with only slight grinding or honing.

The cores can previously be coated with an antiadhesion agent such as graphite or molybdenum disulfide, prior to insertion in the body to facilitate removal of the cores from the wear-resistant layer.

By way of example, the pressures applied in the chamber can be 1800 bar or more and the temperature can range from 850° C. to 1200° C. The gas in the chamber can be an inert gas, for example, argon.

I claim:

1. An extruder housing for a double-screw extruder for processing plastics and synthetic resins, said extruder house comprising:
   a seamless elongated body formed with a pair of adjacent longitudinally extending generally conical bores for receiving respective conical extruder screws and together defining a figure-eight cross section cavity, each of said bores being provided with a plurality of axially spaced generally annular steps;
   a wear resistant layer of a hard powder-metallurgical material in a hot isostatic-pressed structure extending along and lining said cavity against said body, said layer filling said steps and having smooth conical walls; and
   a diffusion layer formed by said material of said layer and material of said body bonding said wear resistant layer to said body.

2. The extruder housing defined in claim 1 wherein both of said bores are conical for receiving conical extruder screws.

3. The extruder housing defined in claim 1 wherein said diffusion layer is formed between said wear-resistant layer and said body over cylindrical portions and transverse portions of respective steps.

4. The extruder housing defined in claim 1, further comprising means for connecting said body with said layers therein to other bodies in the formation of said housing.

5. The extruder housing defined in claim 1 wherein said body and said layers extend the full length of the extruder housing for said double-screw extruder.

6. A method of producing an extruder housing comprising the steps of:
   (a) forming a seamless-elongated body having a pair of adjacent longitudinally-extending bores together defining a figure-eight cross section each of said bores being provided with a plurality of axially spaced generally annular steps;
   (b) lining said bores with a powder of a hard material capable of hot-isostatic pressing into a coherent layer along said bores and filling said steps with said powder;
   (c) confining said powder between a pair of conical cores and the walls of said bores;
   (d) sealing said powder in said body;
   (e) introducing said body with said cores, and said powder into a pressure vessel and subjecting said powder to hot isostatic pressing by applying pressure from the exterior of said body inwardly and plastically deforming said body, therefore bonding said body into a wear-resistant layer along said bores and forming a diffusion layer of material of said powder and material of said body bonding said wear-resistant layer to said body; and (f) removing said cores to leave smooth conical walls of said layer delimiting smooth cavities for receiving generally conical screws.

7. The method defined in claim 6 wherein the hot isostatic pressing is effected in an inert gas atmosphere at a pressure of at least 1800 bar.

8. The method defined in claim 7 wherein said atmosphere is an argon atmosphere.

9. The method defined in claim 6 wherein the pressure applied to said body from the exterior inwardly is braced against the conical cores.

10. The method defined in claim 6 wherein the hot isostatic pressing is effected without encapsulation of the body or powder within a separate capsule.

11. The method defined in claim 6, further comprising applying to said cores an antiadhesion medium facilitating separation of said cores from said wear-resistant layer.

12. The method defined in claim 6 wherein the hot isostatic pressing is effected at a temperature of about 850° C. to 1200° C. in said chamber.

* * * * *